(12) United States Patent
Ito

(10) Patent No.: US 8,752,599 B2
(45) Date of Patent: Jun. 17, 2014

(54) PNEUMATIC RADIAL TIRE

(75) Inventor: Takahiro Ito, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 381 days.

(21) Appl. No.: 12/741,088

(22) PCT Filed: Oct. 31, 2008

(86) PCT No.: PCT/JP2008/069956
§ 371 (c)(1),
(2), (4) Date: Jun. 9, 2010

(87) PCT Pub. No.: WO2009/057780
PCT Pub. Date: May 7, 2009

(65) Prior Publication Data
US 2010/0252157 A1  Oct. 7, 2010

(30) Foreign Application Priority Data

Nov. 2, 2007 (JP) .................................. 2007-286335

(51) Int. Cl.
*B60C 11/11* (2006.01)
*B60C 9/17* (2006.01)
*B60C 11/117* (2006.01)

(52) U.S. Cl.
USPC ................. 152/209.8; 152/209.9; 152/209.14; 152/454; 152/456

(58) Field of Classification Search
USPC ............ 152/209.8, 209.14, 454–456, 209.23, 152/209.24, 209.25; D12/505–532
See application file for complete search history.

(56) References Cited

U.S. PATENT DOCUMENTS 4,785,863 A * 11/1988 Tsuda et al. ................ 152/209.8
5,415,215 A * 5/1995 Covert et al. .............. 152/209.9

(Continued)

FOREIGN PATENT DOCUMENTS

DE 3815829 * 12/1988
EP 524568 * 1/1993

(Continued)

OTHER PUBLICATIONS

English machine translation of JP2003-251632, Sep. 2003.*

(Continued)

*Primary Examiner* — Steven D Maki
*Assistant Examiner* — Robert Dye
(74) *Attorney, Agent, or Firm* — Sughrue Mion, PLLC

(57) ABSTRACT

A pneumatic radial tire includes a pair of annular bead portions 2A, 2B, a tread portion 3 having a tread surface portion, a pair of sidewall portions 4A, 4B each connecting one of both end portions of tread portion 3 in tire-width directions and an outward end in the tire-radial direction of the corresponding one of the bead portions 2A, 2B, and a carcass layer 5 extending continuously across and through the bead portions 2A, 2B, the sidewall portions 3, and the tread portion 4A, 4B, the carcass layer 5 being configured to form a framework of the tire. Main grooves are formed respectively in a tire's equatorial portion including a center line in the tire-width directions of the tread portion and in a portion located closer to a vehicle-fitted inner side than the tire's equatorial portion is, each main groove extending continuously in a tire-circumferential direction of the tread portion, a land-portion block row in which a plurality of blocks are consecutively arranged in the tire-circumferential direction is formed in a portion of the tread portion located closer to a vehicle-fitted outer side than the tire's equatorial portion of the tire is, and in a section taken in the tire-width directions, a surface curvature radius of a case line of the carcass layer on the vehicle-fitted outer side is larger than a surface curvature radius of a case line of the carcass layer on the vehicle-fitted inner side while the tire is inflated with air.

11 Claims, 5 Drawing Sheets

(56) References Cited

U.S. PATENT DOCUMENTS

| | | | |
|---|---|---|---|
| 5,810,953 A * | 9/1998 | Tanaka et al. | 152/209.5 |
| 2005/0247388 A1 | 11/2005 | Ohsawa et al. | |
| 2006/0162836 A1* | 7/2006 | Maehara et al. | 152/517 |
| 2007/0000590 A1* | 1/2007 | Murata | 152/209.8 |
| 2007/0006955 A1* | 1/2007 | Fukunaga | 152/209.24 |

FOREIGN PATENT DOCUMENTS

| | | | |
|---|---|---|---|
| EP | 1506884 | * | 2/2005 |
| JP | 61-188203 A | | 8/1986 |
| JP | 62-071707 A | | 4/1987 |
| JP | 63-170104 A | | 7/1988 |
| JP | 04-005106 A | | 1/1992 |
| JP | 04-108006 | * | 4/1992 |
| JP | 06-135204 | * | 5/1994 |
| JP | 9-2024 | * | 1/1997 |
| JP | 2002-192906 | * | 7/2002 |
| JP | 2003-251632 | * | 9/2003 |
| JP | 2004-090763 A | | 3/2004 |
| JP | 2005-082026 | * | 3/2005 |

OTHER PUBLICATIONS

English machine translation of Himuro (JP09-002024), dated Jan. 1997.*
English translation of JP04-108006, dated Apr. 1992.*
International Search Report dated Jan. 20, 2009 (with English translation) (5 pages).

* cited by examiner

FIG. 5

| | CONVENTIONAL EXAMPLE | EXAMPLE | MEASUREMENT CONDITIONS |
|---|---|---|---|
| OUTER SIDE: SURFACE CURVATURE, MEASURED IN TIRE-RADIAL DIRECTION, OF CASE LINE | 50 | 85 | 8.0J-17, 210kPa |
| INNER SIDE: SURFACE CURVATURE, MEASURED IN TIRE-RADIAL DIRECTION, OF CASE LINE | 50 | 50 | |
| OUTER SIDE: HEIGHT, MEASURED IN TIRE-RADIAL DIRECTION, OF WIDEST CONVEX PORTION IN TIRE-WIDTH DIRECTION | 53 | 53 | |
| INNER SIDE: HEIGHT, MEASURED IN TIRE-RADIAL DIRECTION, OF WIDEST CONVEX PORTION IN TIRE-WIDTH DIRECTION | 53 | 55 | |
| WIDTH OF CONTACT PATCH OF TIRE (INDEX) | 100 | 100.9 | 8.0J-17, 230kPa, CA:2.0, LOAD:7.5kN |
| AREA OF CONTACT PATCH OF TIRE (INDEX) | 100 | 102.5 | |
| AVERAGE RUNNING SPEED (INDEX) | 100 | 100.8 | 7.5J-17, Fr/Re:230/190kPa |

PNEUMATIC RADIAL TIRE

TECHNICAL FIELD

The invention relates to a pneumatic radial tire in which a main groove extending in a tire-circumferential direction is formed in a tread portion.

BACKGROUND ART

Patent Document 1 discloses a pneumatic radial tire as related conventional art of this kind.

In the pneumatic radial tire, at least one main groove extending in the tire-circumferential direction is formed in a portion on the outer side of the tread portion when the tire is fitted to the vehicle. In addition, of all the main grooves thus formed, the one that is closest to the tire equator line is set to have a relatively large width. Thereby the pneumatic radial tire can improve the drainage of the tread portion.

In addition, in the pneumatic radial tire, at least two main grooves extending in the tire-circumferential direction are formed in portions located on the inner side of the tread portion when the tire is fitted to the vehicle. Of all the main grooves thus formed on this side, the one that is closest to the tire equator line is set to have a relatively small width. Thereby, the pneumatic tire can reduce the noise generated in the tread portion.

Patent Document 1: JP-A 2004-90763

DISCLOSURE OF THE INVENTION

However, the above-described pneumatic radial tire has the following problem. A centrifugal force is generated when the vehicle turns at a corner or the like. The centrifugal force thus generated causes a lateral load on the pneumatic radial tire. The lateral load, in turn, causes a greater load on the sidewall portion on the vehicle-fitted outer side. Accordingly, the greater load may deform the sidewall portion and the tread portion. If such deformation occurs, the contact area of the tread portion is decreased. Consequently, the handling stability of such pneumatic radial tires is impaired while the vehicle is turning.

A pneumatic radial tire may be provided with sidewall portions of increased stiffness both at the outer side and the inner side of the tread portion of the vehicle-fitted tire for reducing such deformation in the sidewall portions. The solution, however, has the following problems. While the vehicle runs straight, the inner side of the tread portion of the vehicle-fitted tire may mainly come into contact with the ground. In this case, the sidewall portion on the inner side of the vehicle-fitted pneumatic radial tire with such a configuration has too high a stiffness to allow the necessary deformation of the sidewall portion. Accordingly, the pneumatic radial tire of such a configuration has the tread portion that cannot follow the road surface well. The vehicle may become less stable when travelling in a straight line and may have inferior acceleration-deceleration performances.

The invention is thus made in view of such circumstances, and aims to provide a pneumatic radial tire capable of: securing sufficient drainage of a tread portion and sufficient stability while the vehicle is travelling straight; and guaranteeing higher handling stability while the vehicle is turning.

To solve the problem, the present invention has the following features. A first feature of the present invention relates to a pneumatic radial tire (tire 1) including a pair of annular bead portions (bead portions 2A, 2B), a tread portion (tread portion 3) located at an external side, in a tire-radial direction, of the pair of bead portions, and including a tread surface portion (tread surface portion 3a), a pair of sidewall portions (sidewall portions 4A, 4B) each connecting one of both end portions of the tread portion in tire-width directions and an outward end in the tire-radial direction of the corresponding one of the bead portions, and a carcass layer (carcass layer 5) extending continuously across and through the bead portions, the sidewall portions, and the tread portion, the carcass layer being configured to form a framework of the tire. Main grooves are formed respectively in a tire's equatorial portion (tire equator line CL) including a center line in the tire-width directions of the tread portion and in a portion located closer to a vehicle-fitted inner side than the tire's equatorial portion is, each main groove extending continuously in a tire-circumferential direction of the tread portion, a land-portion block row (outside-shoulder land-portion row 13) in which a plurality of blocks (blocks 18a) are consecutively arranged in the tire-circumferential direction is formed in a portion of the tread portion located closer to a vehicle-fitted outer side than the tire's equatorial portion of the tire is, and in a section taken in the tire-width directions, a surface curvature radius (surface curvature radius R1) of a case line of the carcass layer on the vehicle-fitted outer side is larger than a surface curvature radius of a case line of the carcass layer on the vehicle-fitted inner side while the tire is inflated with air.

Since each of the front tires is fitted to the vehicle at a certain camber angle, the contact patch of the tread portion of each front tire is mainly located in a portion extending from the tire's equatorial portion towards the vehicle-fitted inner side while the vehicle is running straight. According to the characteristic features, in the tread portion, the main grooves extending in the tire-circumferential direction are formed respectively in the tire's equatorial portion and in the portion located closer to the vehicle-fitted inner side. Accordingly, the pneumatic radial tire can improve the drainage of the tread portion and the straight-running stability.

In addition, in a section taken in the tire-width directions, the case line of the carcass layer on the vehicle-fitted inner side has a smaller surface curvature radius than the surface curvature radius of the case line of the carcass layer on the vehicle-fitted outer side. Accordingly, the sidewall portion on the vehicle-fitted inner side has a lower stiffness than that on the vehicle-fitted outer side, so that the sidewall portion on the vehicle-fitted inner side can deform easily.

Accordingly, while the vehicle is running straight and the sidewall portion on the vehicle-fitted inner side carries a heavier load than the sidewall portion on the vehicle-fitted outer side does, the easily-deformable sidewall portion on the vehicle-fitted inner side gives the tread portion a higher capability of following the road surface. Consequently, the pneumatic radial tire of the aspect of the invention can improve the handling stability and the acceleration/deceleration performance of the vehicle.

Incidentally, when a vehicle turns at a corner or the like, and the pneumatic radial tire fitted to the vehicle receives a lateral centrifugal force, the pneumatic radial tire may be biased towards the vehicle-fitted outer side. If this occurs, in the outwardly-biased tire, a larger portion of the contact patch of the tread portion is located in an area extending from the tire's equatorial portion to the vehicle-fitted outer side. In this case, the sidewall portion on the vehicle-fitted outer side carries a heavier load than the sidewall portion on the vehicle-fitted inner side does. Note that, in the section taken in the tire-width directions, the case line of the carcass layer on the vehicle-fitted outer side has a larger surface curvature radius than the surface curvature radius of the case line of the carcass layer on the vehicle-fitted inner side. Accordingly, the sidewall portion on the vehicle-fitted outer side has a higher stiffness than the sidewall portion on the vehicle-fitted inner side. Consequently, the deformation of the sidewall portion on the vehicle-fitted outer side can be reduced with compared to the sidewall portion on the vehicle-fitted inner side.

In addition, no circumferential-direction grooves are formed in an area extending at the further vehicle-fitted outer side than the tire's equatorial portion of the tread portion. Instead, the land-portion block row in which the plural blocks are continuously arranged one after another in the tire-circumferential direction is formed in that area.

Accordingly, the pneumatic radial tire can secure a sufficient contact patch of the tread portion. Hence, the pneumatic radial tire can enhance the handling stability while the vehicle turns. Consequently, the pneumatic radial tire can improve the lap time while the vehicle fitted with the tire is running on a circuit in the critical state.

As a consequence, the pneumatic radial tire to be provided by the aspect of the invention is capable of securing sufficient drainage of the tread portion and the straight-running stability of the vehicle. In addition, the pneumatic radial tire to be provided is capable of improving the handling stability while the vehicle is turning.

A second feature of the present invention relates to the first feature of the present invention, and a length (length H1, H2), measured in the tire-radial direction, from a widest convex portion (widest convex portion 7a, 7b) of the sidewall portion to the bead portion on the vehicle-fitted outer side is shorter than a corresponding length on the vehicle-fitted inner side, the widest convex portion on each side being a portion that protrudes most in the tire-width directions.

A third feature of the present invention relates to the first or second feature of the present invention, and an area of a contact patch of the tread portion on the vehicle-fitted outer side is larger than a corresponding area on the vehicle-fitted inner side while the tire is fitted to the vehicle.

A fourth feature of the present invention relates to one of the first through third feature of the present invention, and in the tread portion, inner-side lateral grooves (inner-side lateral grooves 15) each extending in the tire-width directions are formed in a portion located at an inner side of the tire's equatorial portion, and outer-side lateral grooves (outer-side lateral grooves 16) each extending in the tire-width directions are formed in a portion located at an outer side of the tire's equatorial portion, and pitches between two outer-side lateral grooves that are adjacent to each other in the tire-circumferential direction are larger than pitches between two inner-side lateral grooves that are adjacent to each other in the tire-circumferential direction.

A fifth feature of the present invention relates to the fourth feature of the present invention, and the pitches between two outer-side lateral grooves that are adjacent to each other in the tire-circumferential direction are approximately twice as wide as the pitches between two inner-side lateral grooves that are adjacent to each other in the tire-circumferential direction.

A sixth feature of the present invention relates to the fourth or fifth feature of the present invention, and the pitches between two inner-side lateral grooves that are adjacent to each other in the tire-circumferential direction are within a range from 2.5% to 5% of a circumferential length of the tire.

A seventh feature of the present invention relates to one of the fourth through sixth feature of the present invention, and the pitches between two outer-side lateral grooves that are adjacent to each other in the tire-circumferential direction are within a range from 5% to 10% of the circumferential length of the tire.

A eighth feature of the present invention relates to one of the first through seventh feature of the present invention, and a width, measured in the tire-width directions, of an outside-shoulder land-portion row (outside-shoulder land-portion row 13A) is wider than a width, measured in the tire-width directions, of an inside-shoulder land-portion row, the outside-shoulder land-portion row is included in the tread portion and formed closer to the vehicle-fitted outer side than the tire's equatorial portion extending in the tire-circumferential direction, and the inside-shoulder land-portion row (inside-shoulder land-portion row 12) is included in the tread portion and formed closer to the vehicle-fitted inner side than the tire's equatorial portion extending in the tire-circumferential direction.

A ninth feature of the present invention relates to the eighth feature of the present invention, and the width, measured in the tire-width directions, of the outside-shoulder land-portion row is approximately 1.5 times as wide as the width, measured in the tire-width directions, of the inside-shoulder land-portion row.

A tenth feature of the present invention relates to the eighth feature of the present invention, and each of the sidewall portions includes a rim-guard portion (rim-guard portion 8a, 8b) that protrudes more externally in the tire-width directions than a rim flange (rim flange 6) where the corresponding bead portion is attached while the tire is fitted to a wheel.

A pneumatic radial tire to be provided according to the aspects of the invention is capable of: securing sufficient drainage of a tread portion and straight-running stability of the vehicle; and improving the handling stability while the vehicle is turning.

BRIEF DESCRIPTION OF THE DRAWINGS

FIG. 5 shows Example of the invention and is figure showing various data in measuring the width and the contact patch of each of pneumatic radial tires and the average running speed of the same test vehicle fitted with the respective tires running on a circuit test course regarding Conventional Example and the embodiment.

BEST MODES FOR CARRYING OUT THE INVENTION

Embodiments

Figure 1:
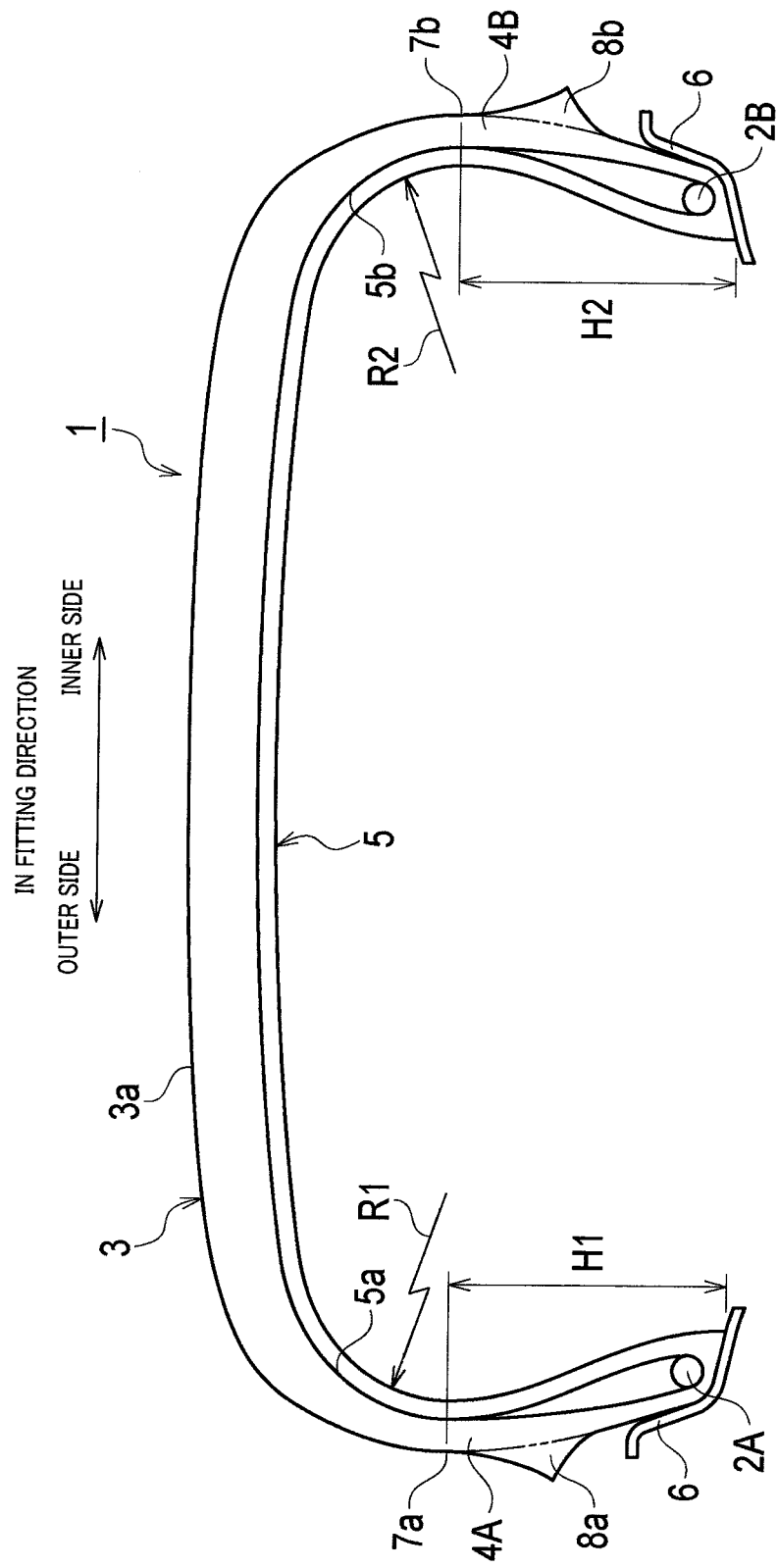
FIG. 1 shows an embodiment of the invention and is a sectional view of a pneumatic radial tire inflated with air.

Some embodiments of the invention will be described below by referring to the drawings. Specifically, (1) overall configuration of a pneumatic radial tire; (2) detailed configuration of a tread surface portion; (3) detailed configuration of an outer-side lateral groove; and (4) advantageous effects are explained.

Figure 2:
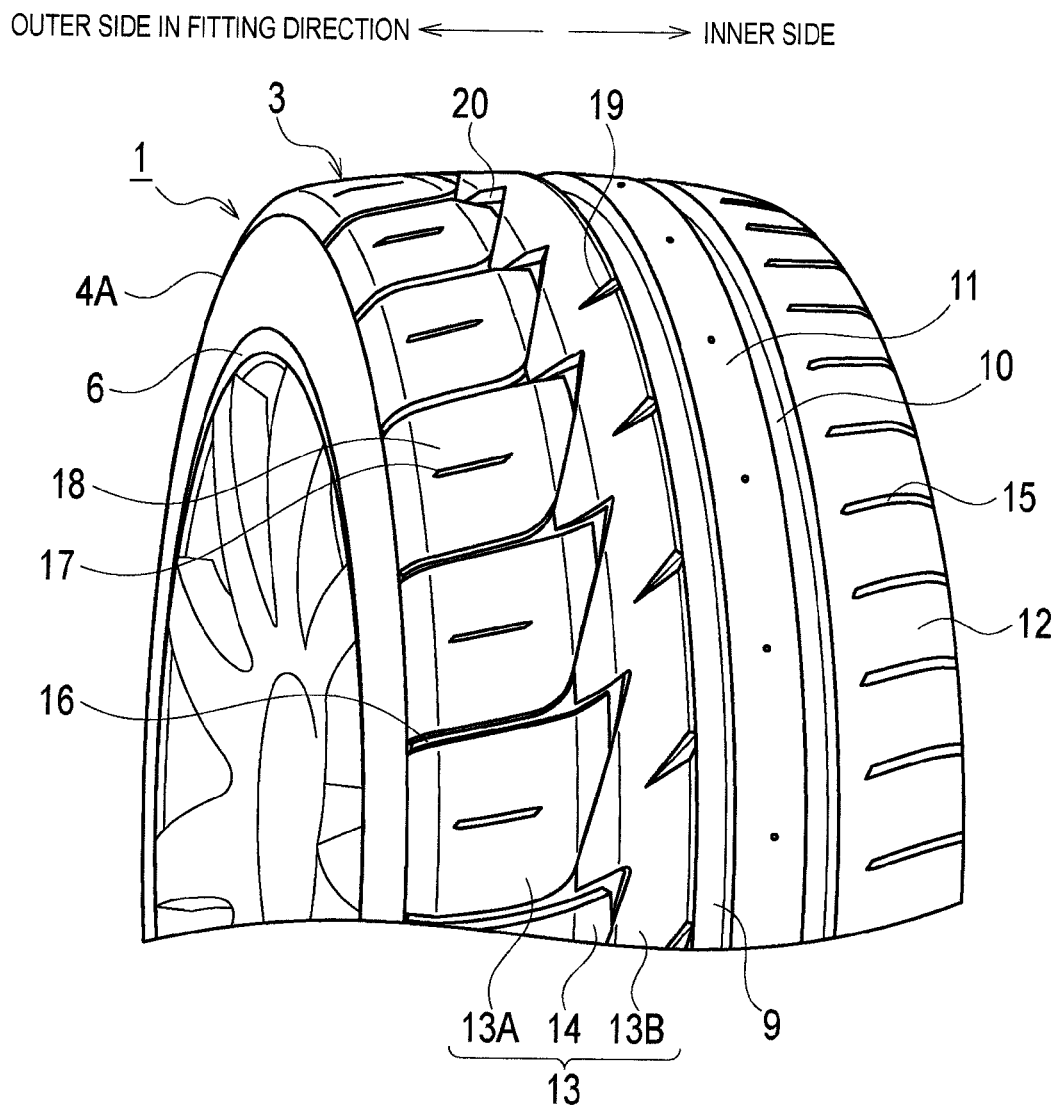
FIG. 2 shows the embodiment of the invention and is a perspective view of the pneumatic radial tire.
Figure 3:
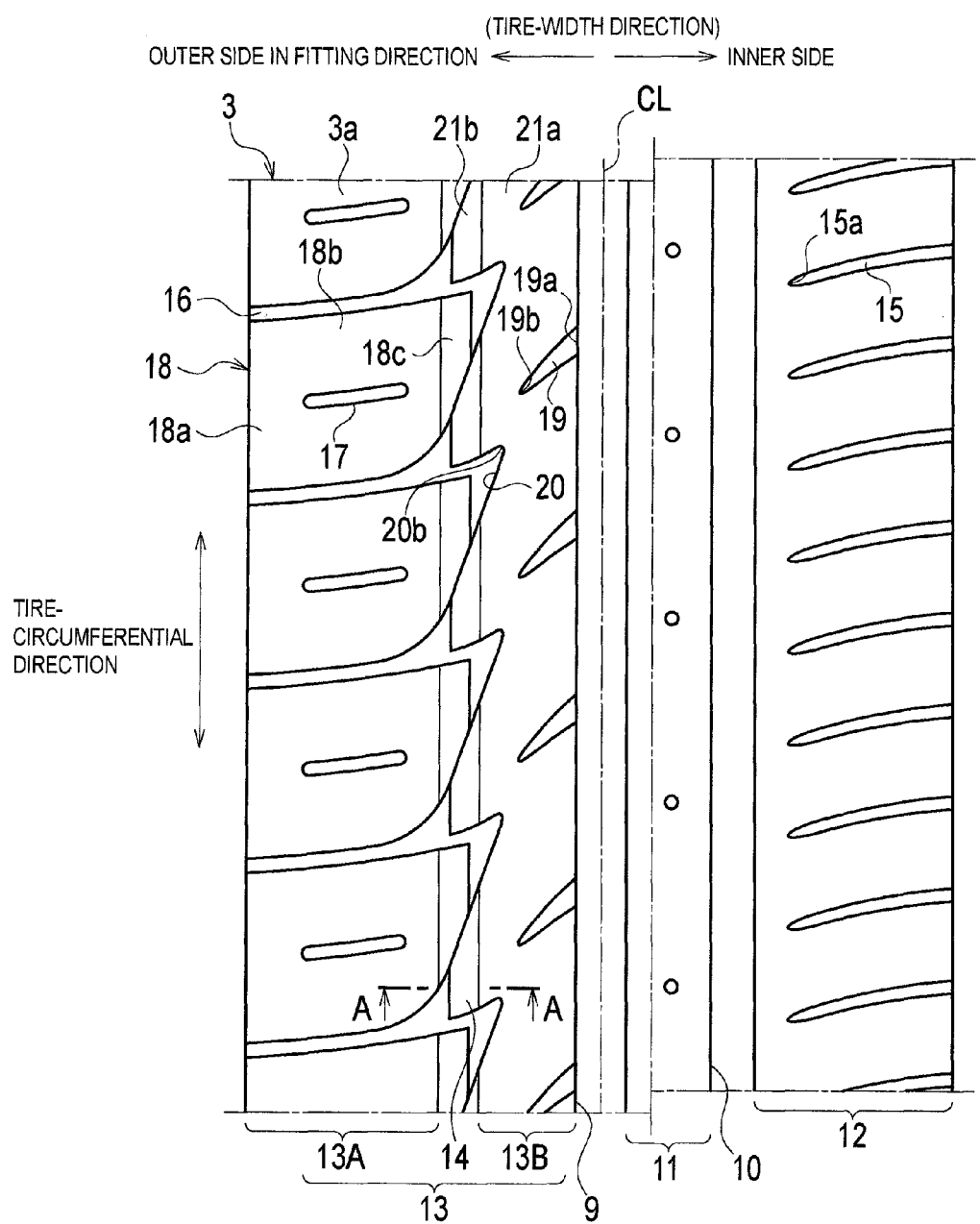
FIG. 3 shows the embodiment of the invention and is a development of a pattern formed in a tread portion of the pneumatic radial tire.

FIGS. 1 to 3 show an embodiment of the invention. FIG. 1 is a sectional view of a pneumatic radial tire inflated with air.

(1) Overall Configuration of Pneumatic Radial Tire

The overall configuration of the pneumatic radial tire will be described by referring to FIG. 1. As FIG. 1 shows, a pneumatic radial tire (hereafter, referred to as a "tire") 1 of this embodiment includes a left-and-right pair of bead portions 2A and 2B, a tread portion 3, a left-and-right pair of sidewall portions 4A and 4B, and a carcass layer 5.

Each of the bead portions 2A and 2B has an annular shape. The tread portion 3 is located at the outer side, in a tire-radial direction, of the bead portions 2A and 2B. The tread portion 3 includes a tread surface portion 3a. The sidewall portion 4A connects an end portion of the tread portion 3 in a tire-width direction and the outward end in the tire-radial direction of the bead portion 2A. Meanwhile, the sidewall portion 4B connects an end portion of the tread portion 3 in the tire-width direction and the outward end in the tire-radial direction of the bead portion 2B. The carcass layer 5 extends continuously across and through the bead portions 2A and 2B, the sidewall portions 4A and 4B, and the tread portion 3.

Before the tire 1 of this embodiment is inflated with air at a predetermined air pressure, end portions located at the sides of the bead portions 2A and 2B are attached respectively to rim flanges 6. The tire 1 is fitted to the vehicle so that the pre-designated inner side of the tire 1 has to face the vehicle and that the pre-designated outer side of the tire has to face the opposite side. Specifically, the bead portion 2A and the sidewall portion 4A located on one side of the tire 1 have to be fitted on a vehicle-fitted outer side that is an outer side of the tire 1 in the fitting direction to the vehicle. Meanwhile, the bead portion 2B and the sidewall portion 4B located on the other side of the tire 1 have to be fitted on a vehicle-fitted inner side that is an inner side of the tire 1 in the fitting direction to the vehicle.

When the tire 1 is inflated with air, a surface curvature radius R1 is defined as the surface curvature radius measured in a section taken in the width directions of a case line 5a of the carcass layer 5, the case line 5a extending from the bead portion 2A on the vehicle-fitted outer side towards the tread portion 3. In addition, a surface curvature radius R2 is defined as the surface curvature radius measured in the above-mentioned section of the tire 1 and in the above-mentioned state of a case line 5b of the carcass layer 5, the case line 5b extending from the bead portion 2B on the vehicle-fitted inner side towards the tread portion 3. The surface curvature radius R1 is set larger than the surface curvature radius R2.

Specifically, the case line of the carcass layer 5 is defined as the center line of the carcass layer 5 extending all along the carcass layer 5 in a section taken in the tire-width directions. The surface curvature radius of a case line refers to the curvature radius of the carcass layer 5 extending in an area from one of the sidewall portions 4A and 4B to the corresponding tire-width-direction end portion of the tread portion 3.

The sidewall portions 4A and 4B respectively include widest convex portions 7a and 7b, which are the portions protruding most externally in the tire-width directions. In addition, rim-guard portions 8a and 8b are formed respectively in the sidewall portions 4A and 4B. Each of the rim-guard portions 8a and 8b is formed closer to the corresponding rim flange 6 than the corresponding one of the widest convex portions 7a and 7b is. The rim-guard portions 8a and 8b protrude more externally in the tire-width directions than the rim flanges 6 of their respective sides.

The widest convex portion 7a and 7b protrude more externally in the tire-width directions than any other portions of the tire 1 except the rim-guard portions 8a and 8b.

Now, a length H1 is defined as the length, measured in the tire-radial directions, from the widest convex portion 7a of the sidewall portion 4A to the bead portion 2A on the vehicle-fitted outer side. In addition, a length H2 is defined as the length, measured in the tire-radial directions, from the widest convex portion 7b of the sidewall portion 4B to the bead portion 2B on the vehicle-fitted inner side. The length H1 is set shorter than the length H2.

(2) Detailed Configuration of Tread Surface Portion

FIG. 2 is a perspective view of the pneumatic radial tire. FIG. 3 is a development of a pattern formed in the tread portion of the pneumatic radial tire.

As FIGS. 2 and 3 show, two main grooves 9 and 10 as well as plural land-portion rows 11, 12, and 13 are formed in the tread surface portion 3a of the tire 1. Each of the main grooves 9 and 10 extends in a tire-circumferential direction. Each of the land-portion rows 11, 12, and 13 extends in the tire-circumferential direction.

The main groove 9 is formed in a tire's equatorial portion that includes a tire equator line CL. The main groove 10 is formed in a portion located closer to the vehicle-fitted inner side than the tire's equatorial portion is. There is a certain space, in the tire-width directions, between the main groove 9 and the main groove 10.

The two main grooves 9 and 10 sub-divide the tread surface portion 3a into the center land-portion row 11, the inside-shoulder land-portion row 12, and the outside-shoulder land-portion row 13.

The center land-portion row 11 is located in a portion located closer to the vehicle-fitted inner side than the tire's equatorial portion is; thus, the center land-portion row 11 is shifted by just a short distance from the tire's equatorial portion. The inside-shoulder land-portion row 12 is located closer to the vehicle-fitted inner side than the center land-portion row 11 is. The outside-shoulder land-portion row 13 is located closer to the vehicle-fitted outer side than the tire's equatorial portion is.

The width, measured in the tire-width directions, of the outside-shoulder land-portion row 13 is wider than the width, measured in the tire-width directions, of the inside-shoulder land-portion row 12. Specifically, the width, measured in the tire-width directions, of the outside-shoulder land-portion row 13 is set approximately 1.5 times as wide as the width, measured in the tire-width directions, of the inside-shoulder land-portion row 12. Note that the "approximately 1.5 times" mentioned above means not only a factor of exact 1.5 but also any factor within a range from 1.3 to 1.8.

A V-shaped groove 14 is formed in the outside-shoulder land-portion row 13 so as to extend in the tire-circumferential direction. The V-shaped groove 14 sub-divides the outside-shoulder land-portion row 13 into a first outside-shoulder land-portion row 13A and a second outside-shoulder land-portion row 13B. The first outside-shoulder land-portion row 13A is located closer to the vehicle-fitted outer side than the tire's equatorial portion of the tread portion 3. The first outside-shoulder land-portion row 13A includes a land-portion block row in which plural blocks 18a (which will be described later) are arranged continuously in the tire-circumferential direction.

Inner-side lateral grooves 15 are formed in the tread portion 3 and located closer to the vehicle-fitted inner side than the tire's equatorial portion is. Each of the inner-side lateral grooves 15 extends in the tire-width directions. Specifically, in the inside-shoulder land-portion row 12, the plural inner-side lateral grooves 15 are arranged in the tire-circumferential direction at certain intervals.

The pitch between two inner-side lateral grooves 15 that are adjacent to each other in the tire-circumferential direction is set within a range from 2.5% to 5% of the circumferential length of the tread portion 3.

Each of the inner-side lateral grooves 15 has an end located on the internal side in the tire-width directions, i.e., an "internal end 15a" and an end located on the external side in the tire-width directions, i.e., an "external end". Specifically, the internal ends 15a are located at positions closer to the vehicle-fitted inner side than the main groove 10, which is formed in the portion located on the vehicle-fitted inner side. The external ends of the inner-side lateral grooves 15 are positioned on one of the both side portions of the tread portion 3. Specifically, the external ends of the inner-side grooves 15 are positioned on the side portion located on the vehicle-fitted inner side.

Accordingly, each of the inner-side lateral grooves 15 extends in the tire-width directions across the tire-width-direction end portion of the tread surface portion 3a located on the vehicle-fitted inner side.

Outer-side lateral grooves are formed in the tread portion 3 and located closer to the vehicle-fitted outer side than the tire's equatorial portion is. Each of the outer-side lateral grooves extends in the tire-width directions, and includes a first outer-side lateral groove 16. Specifically, the first outer-side lateral grooves 16 are formed in the first outside-shoulder land-portion row 13A.

In the first outside-shoulder land-portion row 13A, the first outer-side lateral grooves 16 and second outer-side lateral grooves 17 are formed alternately in the tire-circumferential direction. Each of the lateral grooves 16 and 17 extends in the tire-width directions.

Each of the first outer-side lateral grooves 16 has an end located on the internal side in the tire-width directions, i.e., an "internal end" and an end located on the external side in the tire-width directions, i.e., an "external end".

Specifically, the internal ends of the first outer-side lateral grooves 16 are communicatively connected to the V-shaped groove 14. Each of the first outer-side lateral grooves 16 extends across the end portion of the tread surface portion 3a located on the vehicle-fitted outer side until the external end of the first outer-side lateral groove 16 reaches one of the two side portions of the tread portion 3. Specifically, the external end of the first outer-side lateral groove 16 reaches the side portion located on the vehicle-fitted outer side.

Accordingly, the first outer-side lateral grooves 16 subdivide the first outside-shoulder land-portion row 13A into the plural blocks 18a. In other words, in the first outside-shoulder land-portion row 13A, the plural blocks 18a are arranged consecutively in the tire-circumferential direction.

Both of the two tire-width-direction ends of each of the second outer-side lateral grooves 17 are located within corresponding one of outside-shoulder land portions 18. No end of each second outer-side lateral groove 17 reaches the V-shaped groove 14. In addition, no end of each second outer-side lateral groove 17 reaches the side portion of the tread portion 3 located on the vehicle-fitted outer side.

Within the first outside-shoulder land-portion row 13A, and portions including the contact patch at the end portion of the tread portion 3 located on the vehicle-fitted outer side forms the blocks 18a extending continuously in the tire-circumferential direction.

Specifically, the pitches between two first outer-side lateral grooves 16 that are adjacent to one another in the tire-circumferential direction within the blocks 18a are set within a range from 5% to 10% of the circumferential length of the tread portion 3.

Accordingly, the pitches of the first outer-side lateral grooves 16 are larger than the pitches of the inner-side lateral grooves 15. Specifically, the pitches of the first outer-side lateral grooves 16 are set approximately twice as large as the pitches of the inner-side lateral grooves 15.

(3) Detailed Configuration of Outer-Side Lateral Groove

Figure 4:
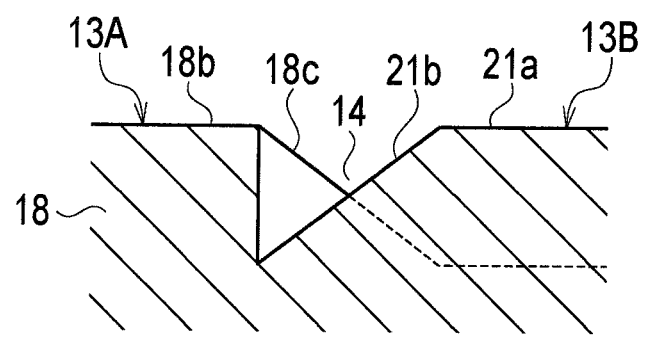
FIG. 4 shows the embodiment of the invention and is a sectional view taken along the line A-A of FIG. 3.

Next, detailed configurations of outer-side lateral grooves of this embodiment will be described by referring to FIGS. 3 and 4. FIG. 4 is a sectional view taken along the line A-A of FIG. 3.

In the second outside-shoulder land-portion row 13B, third outer-side lateral grooves 19 and fourth outer-side lateral grooves 20 are formed alternately in the tire-circumferential direction. Each of the lateral grooves 19 and 20 extends in the tire-width directions.

The plural third outer-side lateral grooves 19 are formed in an end portion of the second outside-shoulder land-portion row 13B, and this end portion of the second outside-shoulder land-portion row 13B refers to the one located on the vehicle-fitted inner side. The plural third outer-side lateral grooves 19 are arranged in the tire-circumferential direction at certain intervals. Each of the third outer-side lateral grooves 19 is communicatively connected to the main groove 9, which is formed in the tire's equatorial portion.

Each of the third outer-side lateral grooves 19 has a first end 19a and a second end 19b. The first end 19a faces the main groove 9, and is formed as a widely-open end. The second end 19b is located in the middle portion, in the tire-width directions, of the second outside-shoulder land-portion row 13B. Each of the third outer-side lateral grooves 19 becomes gradually narrower from the widely-open first end 19a towards the closed second end 19b. Accordingly, each of the third outer-side lateral grooves 19 has a V-shape.

The plural fourth outer-side lateral grooves 20 are formed in an end portion of the second outside-shoulder land-portion row 13B, and this end portion of the second outside-shoulder land-portion row 13B refers to the one located on the vehicle-fitted outer side. The plural fourth outer-side lateral grooves 20 are arranged in the tire-circumferential direction at certain intervals. Each of the fourth outer-side lateral grooves 20 is communicatively connected to the V-shaped groove 14.

Each of the fourth outer-side lateral grooves 20 has a first end and a second end 20b. The first end faces the V-shaped groove 14, and is formed as a widely-open end. The second end 20b is located in the middle portion, in the tire-width directions, of the second outside-shoulder land-portion row 13B. Each of the fourth outer-side lateral grooves 20 becomes gradually narrower from the widely-open first end towards the closed second end 20b. Accordingly, each of the fourth outer-side lateral grooves 20 has a V-shape.

Each of the outside-shoulder land portions 18 includes a first top-surface portion 18b and a first sloping-surface portion 18c. The first top-surface portion 18b is located on the outer side in the tire-width direction. As the first sloping-surface portion 18c extends from the first top-surface portion 18b to the inner side in the tire-width direction, the dent thus formed in the tire-radial direction becomes deeper and deeper.

Likewise, the second outside-shoulder land portion row 13B includes a second top-surface portion 21a and second sloping-surface portions 21b. The second top-surface portion 21a is located on the outer side in the tire-width direction. As each of the second sloping-surface portions 21b extends from the second top-surface portion 21a to the outer side in the tire-width direction, the dent thus formed in the tire-radial direction becomes deeper and deeper.

When the tire 1 is placed on a flat road surface under regular conditions and is kept stationary, the first top-surface portions 18b and the second top-surface portion 21a are in contact with the road surface. That is, the first top-surface portions 18b and the second top-surface portion 21a form a part of the contact patch of the tire 1 in that state.

The position, in the tire-circumferential direction, of each of the first sloping-surface portions 18c overlaps the position, in the tire-circumferential direction, of the corresponding one of the second sloping-surface portions 21b. The first sloping-surface portions 18c and the second sloping-surface portions 21b form a part of the sidewalls of the V-shaped groove 14, which is formed in the outside-shoulder land-portion row 13 located closer to the vehicle-fitted outer side than the tire's equatorial portion is.

Unlike the two main grooves 9 and 10, the depth (the dimension in the tire-radial direction) of the V-shaped groove 14 is not constant. The depth of the V-shaped groove 14 varies from one position to another in the tire-circumferential direction. The V-shaped groove 14 has flat bottom portions at portions where the first outer-side lateral grooves 16 are communicatively connected to the fourth outer-side lateral grooves 20. The depths of the bottom portions are approximately the same as those of the first outer-side lateral grooves 16 and the fourth outer-side lateral grooves 20. In addition, bottom portions of different kinds are also formed in the V-shaped groove 14. These bottom portions correspond to the first sloping-surface portions 18c and the second sloping-surface portions 21b, so that these bottom portions are sloping. These sloping bottom portions are not as deep as the first lateral grooves 16 and not as deep as the fourth outer-side lateral grooves 20 either.

Accordingly, the V-shaped groove 14 is not formed as a groove which is continuous in the tire-circumferential direction with a constant depth that is approximately equal to the depths of the first outer-side lateral grooves 16 and the fourth outer-side lateral grooves 20. That is, the V-shaped groove 14 is formed as a discontinuous groove in that sense.

With the above-described configuration, while the vehicle goes straight, if the steering angle of the front wheels is small, each of the front tires 1, which is fitted to the vehicle at a camber angle (CA), has a contact patch of the tread portion 3 located mainly in an area extending from the tire's equatorial portion to the vehicle-fitted inner side. In this case, the sidewall portion 4B on the vehicle-fitted inner side carries a heavier load than the sidewall portion 4A on the vehicle-fitted outer side does.

In contrast, while the vehicle turns at a corner or the like, if the steering angle is large, the tire 1 receives a lateral centrifugal force and may be biased to the vehicle-fitted outer side. If this occurs, the contact patch of the tread portion 3 shifts from the tire's equatorial portion towards the vehicle-fitted outer side. Accordingly, the sidewall portion 4A on the vehicle-fitted outer side carries a heavier load than the sidewall portion 4B on the vehicle-fitted inner side.

The tread portion 3 has an asymmetric pattern when the area extending from the tire's equatorial portion towards the vehicle-fitted outer side is compared to the area extending from the tire's equatorial portion towards the vehicle-fitted inner side. In addition, the main groove 9 is formed in the tire's equatorial portion, and the main groove 10 is formed in the portion on the vehicle-fitted inner side. The pitches of the lateral grooves 15 formed on the vehicle-fitted inner side are set within a range from 2.5% to 10% of the circumferential length of the tread portion 3. Both the pitches of the lateral grooves 16 and the pitches of the lateral grooves 17 formed on the vehicle-fitted outer side are set larger than the pitches of the lateral grooves 15.

Accordingly, the tire 1 can secure a larger area of the contact patch on the vehicle-fitted outer side in the tread portion 3 than the area of the contact patch on the vehicle-fitted inner side.

(4) Advantageous Effects

As has been described thus far, in the tire 1 of this embodiment, while the vehicle goes straight, each of the front tires 1, which is fitted to the vehicle at a certain camber angle, has a contact patch of the tread portion 3 located mainly in an area extending from the tire's equatorial portion to the vehicle-fitted inner side. Here, in the tread portion 3, the main grooves 9 and 10 extend in the tire-circumferential direction. The main groove 9 is formed in the tire's equatorial portion and the main groove 10 is formed in the portion on the vehicle-fitted inner side. Accordingly, the tire 1 can improve the drainage of the tread portion 3 and the straight-running capability.

In the tire 1, in a section taken in the tire-width directions, the surface curvature radius R2 of the case line 5b of the carcass layer 5 on the vehicle-fitted inner side is smaller than the surface curvature radius R1. Accordingly, the stiffness of the sidewall portion 4B on the vehicle-fitted inner side is lower than that on the vehicle-fitted outer side. Consequently, the sidewall portion 4B can be deformed more easily.

Accordingly, while the vehicle is running straight and the sidewall portion 4B on the vehicle-fitted inner side carries a heavier load than the sidewall portion 4A on the vehicle-fitted outer side does, the easily-deformable sidewall portion 4B on the vehicle-fitted inner side gives the tread portion 3 a higher capability of following the road surface. Consequently, the tire 1 can improve the handling stability and the acceleration/deceleration performance of the vehicle.

In contrast, when the vehicle turns at a corner or the like, and the tires 1 fitted to the vehicle receive a lateral centrifugal force, some of the tires 1 are biased towards the vehicle-fitted outer side. If this occurs, in each of such outwardly-biased tires 1, a larger portion of the contact patch of the tread portion 3 is located in an area extending from the tire's equatorial portion to the vehicle-fitted outer side. In this case, the sidewall portion 4A on the vehicle-fitted outer side carries a heavier load than the sidewall portion 4B on the opposite side does. Even in this case, since the sidewall portion 4A on the vehicle-fitted outer side has higher stiffness than the stiffness of the sidewall portion 4B, the deformation of the sidewall portion 4A can be reduced with compared to the deformation of the sidewall portion 4B.

In the tread portion 3, no circumferential-direction grooves are formed in an area located on the further vehicle-fitted outer side of the tire's equatorial portion. Instead, the first outside-shoulder land-portion row 13A in which the plural blocks 18a are arranged consecutively in the tire-circumferential direction is formed in that area.

Accordingly, the tire 1 can secure sufficient contact patch of the tread portion 3. Consequently, the tire 1 can improve the handling stability while the vehicle is turning. In addition, the tire 1 can improve the lap time while the vehicle is running on a circuit in the critical state.

Hence, the tire 1 to be provided is a pneumatic radial tire not only capable of securing the drainage of the tread portion 3 and the straight-running stability of the vehicle but also capable of improving the handling stability when the vehicle is turning.

In this embodiment, in the contact patch at the end portion of the tread portion 3 on the vehicle-fitted outer side, no circumferential-direction grooves are formed but only the first outer-side lateral grooves 16 are formed at longer pitches. In the contact patch at the end portion, the first outside-shoulder land-portion row 13A is formed by arranging the plural blocks 18a consecutively in the tire-circumferential direction. In addition, the external end, in the tire-width direction, of each of the second outer-side lateral grooves is terminated within the corresponding outside-shoulder land portion 18.

Accordingly, the tire 1 can improve the stiffness of the contact patch at the end portion of the tread portion 3 on the vehicle-fitted outer side, and can thereby reduce the deformation of the tread portion 3. Thus, a larger contact patch can be secured and the durability of the tread portion can be improved. Hence, the tire 1 can improve the axial-direction stiffness of the contact patch at the end portion of the tread portion 3 on the vehicle-fitted outer side when the vehicle turns. As a consequence, when the vehicle turns, the tire 1 can reduce the deformation of the tread portion 3 and thereby a larger cornering force can be obtained.

In this embodiment, the length H2 measured in the tire-radial direction from the widest convex portion 7b of the sidewall portion 4B to the bead portion 2B on the vehicle-fitted inner side is longer than the length H1 measured in the tire-radial direction from the tire-width-direction widest convex portion 7a of the sidewall portion 4A to the bead portion 2A on the vehicle-fitted outer side. Accordingly, the stiffness of the sidewall portion 4B is lower than the stiffness of the sidewall portion 4A, so that the sidewall portion 4B can be deformed more easily. Consequently, while the vehicle is running straight, the tire 1 allows the tread portion 3 to follow better the road surface.

The length H1 measured in the tire-radial direction from the tire-width-direction widest convex portion 7a of the sidewall portion 4A to the bead portion 2A on the vehicle-fitted outer side is shorter than the length H2. Accordingly, the stiffness of the sidewall portion 4A is higher than the stiffness of the sidewall portion 4B. Hence, when the vehicle turns and heavier loads are applied to the vehicle-fitted outer side, the tire 1 can reduce the deformation of the sidewall portion 4A and can thereby secure still larger area of the contact patch of the tread portion 3. Consequently, the tire 1 can further improve the handling stability when the vehicle turns.

In this embodiment, if the tire 1 that is fitted to the vehicle receives a lateral centrifugal force while the vehicle fitted with the tire 1 is turning and if, as a result, the tire 1 is biased towards vehicle-fitted outer side, the contact patch of the tread portion 3 is mainly located on the vehicle-fitted outer side. If this occurs, the contact patch of the tread portion 3 located on the vehicle-fitted outer side is larger than that on the vehicle-fitted inner side. Accordingly, the tire 1 can secure a larger contact patch of the tread portion 3.

In this embodiment, the pitches between two outer-side lateral grooves 16 that are adjacent to each other in the tire-circumferential direction are larger than the pitches between two inner-side lateral grooves 15 that are adjacent to each other in the tire-circumferential direction. Accordingly, the drainage of the vehicle-fitted inner-side portion of the tread portion 3 can be further improved with compared to that of the vehicle-fitted outer-side portion of the tread portion 3. In addition, the stiffness of the vehicle-fitted outer-side portion of the tread portion 3 can be further improved with compared to that of the vehicle-fitted inner-side portion of the tread portion 3.

In this embodiment, the pitches of the inner-side lateral grooves 15, each extending in the tire-width directions and located on the vehicle-fitted inner side of the tread portion 3, are within a range from 2.5% to 5.0% of the circumferential length of the tire 1. Accordingly, the tire 1 can improve further the drainage on the vehicle-fitted inner side while securing certain stiffness of the tread portion 3 on this side.

In this embodiment, the pitches of the outer-side lateral grooves 16, each extending in the tire-width directions and located on the vehicle-fitted outer side of the tread portion 3, are within a range from 5% to 10% of the circumferential length of the tire 1. Accordingly, the tire 1 can improve further the stiffness of the tread portion 3 on the vehicle-fitted outer side while securing certain drainage of the tread portion 3 on this side.

In this embodiment, the outer-side pitches of the outer-side lateral grooves, each extending in the tire-width directions and located on the vehicle-fitted outer side of the tread portion 3, are approximately twice as large as the inner-side pitches of the inner-side lateral grooves, each extending in the tire-width directions and located on the vehicle-fitted inner side of the tread portion 3. Accordingly, the tire 1 can further improve the stiffness of the tread portion 3 on the vehicle-fitted outer side, and thereby can improve the turning performance.

In this embodiment, the first outside-shoulder land-portion row 13A has a tire-width-direction width that is wider than the corresponding width of the inside-shoulder land-portion row 12. Accordingly, the tire 1 can further improve the stiffness of the tread portion 3 on the vehicle-fitted outer side with compared to the stiffness of the tread portion 3 on the vehicle-fitted inner side.

In this embodiment, the tire-width-direction width of the first outside-shoulder land-portion row 13A is approximately 1.5 times as wide as the corresponding width of the inside-shoulder land-portion row 12. Accordingly, the stiffness of the tread portion 3 on the vehicle-fitted outer side can be further improved while certain drainage of the tread portion 3 on the same side can be secured.

In this embodiment, the rim-guard portions 8a and 8b of the sidewall portions 4A and 4B protrude more externally in the tire-width directions than the corresponding rim flanges 6. Accordingly, the occurrence of the contact of the rim flanges 6 with a block such as a roadside curb can be made less likely.

In this embodiment, the V-shaped groove 14 having the first sloping-surface portions 18c and the second sloping-surface portions 21b as parts of the sidewalls of the V-shaped groove 14 is formed in the outside-shoulder land-portion row 13. Accordingly, the tire 1 can make the first and the second sloping-surface portions 18c and 21b absorb the compressing forces that are directed inwards in the tire-radial direction and acting on the first top-surface portions 18b and the second top-surface portion 21a, respectively.

Accordingly, even if large compressing forces directed inwards in the tire-radial direction act on the first top-surface portions 18b and the second top-surface portion 21a while the vehicle is running on a dry road surface, the tire 1 can prevent the buckling from occurring and can prevent the handling stability from being impaired.

Incidentally, the water that exist between a wet road surface and the first top-surface portions 18b, as well as between the wet road surface and the second top-surface portion 21a can be made to flow on the first and the second top-surface portions 18c and 21b. The water thus channeled is allowed to flow into the V-shaped groove 14 smoothly without much resistance. Accordingly, the tire 1 can prevent the water from forming turbulence within the V-shaped groove 14, so that the drainage of the tire 1 can be improved.

As has been described thus far, in this embodiment, though the V-shaped groove 14 is formed in the outside-shoulder land-portion row 13, the V-shaped groove 14 never significantly impairs the stiffness of the outside-shoulder land-portion row 13.

The V-shaped groove 14 is not formed continuously in the tire-circumferential direction so as to be as deep as the lateral grooves 16 and 20. The V-shaped groove 14 is thus formed discontinuously, so that the flow of the water in the tire-circumferential direction is prevented. Note, however, that an end of each first outer-side lateral groove 16 is communicatively connected to the V-shaped groove 14 and the other end of each first outer-side lateral groove 16 reaches the side portion of the tread portion 3 on the vehicle-fitted outer side. Hence, the tire 1 can improve the drainage of the outside-shoulder land-portion row 13 by channeling the water from the V-shaped groove 14 to the first outer-side lateral grooves 16 and then discharging the water to the vehicle-fitted outer side.

Examples

The width of and the area of the contact patch were measured using a pneumatic radial tire of Conventional Example and a pneumatic radial tire of Example. In addition, the average running speed was measured using a set of the pneumatic radial tires of each kind and the same test vehicle on a circuit-running test course. FIG. 5 shows various data on Example at the testing.

Each of the pneumatic radial tires used in the test had a size of 235/45R17. The surface curvature radius, measured in a section taken in the tire-width direction, of the case line of the carcass layer and the dimension, measured in the tire-width directions, from the bead portion to the widest convex portion were measured with each pneumatic radial tire inflated with air at 210 kPa. The measurement conditions were in conformity with 8.0J-17.

When the width of and the area of the contact patch of each tire were measured, the tire was inflated with air at 230 kPa and a load of 7.5 kN was applied to the inflated tire. The measurement results for Conventional Example were shown with indices of 100. The measurement conditions were in conformity with 8.0J-17, and the camber angle (CA) was 2.0°. The width of and the area of the contact patch become large as the index becomes large.

In addition, a vehicle fitted with the tires was made to run on a circuit-running test course. Five laps were measured and the average time of the fastest three laps was calculated. The average time was converted to an index of the average running speed. The measurement conditions were in conformity with 8.0J-17, and the air pressures for the wheels were Fr/Re: 230/190 kPa. The average running speed become fast as the index becomes large.

The pneumatic radial tire of Conventional Example had a similar tread pattern to the one of the pneumatic radial tire of Example. In addition, in the pneumatic radial tire of Conventional Example, the surface curvature radius, measured in a section taken in the tire-width directions, of the case line of the carcass layer on the vehicle-fitted outer side was equal to the corresponding surface curvature radius on the vehicle-fitted inner side. Moreover, the length, measured in the tire-radial direction in a section taken in the tire-width directions, from the widest convex portion in the tire-width directions to the bead portion on the vehicle-fitted outer side was equal to the corresponding length on the vehicle-fitted inner side. In other words, the pneumatic radial tire of Conventional Example had a symmetric structure.

In the pneumatic radial tire of Example, the surface curvature radius, measured in a section taken in the tire-width direction, of the case line of the carcass layer on the vehicle-fitted inner side was 50, which was equal to the corresponding surface curvature radius of the pneumatic radial tire of Conventional Example. In the pneumatic radial tire of Example, the surface curvature radius, measured in a section taken in the tire-width direction, of the case line of the carcass layer on the vehicle-fitted outer side was 85, which was a relatively large value. In addition, the dimension from the widest convex portion, in the tire-width directions, on the vehicle-fitted outer side to the corresponding bead portion was 53, which was equal to the corresponding dimension of the pneumatic tire of Conventional Example. In the pneumatic radial tire of Example, the dimension from the widest convex portion, in the tire-width direction, on the vehicle-fitted inner side to the corresponding bead portion was 55, which was a relatively large value.

As the measurement results for the pneumatic radial tire of Example, the index representing the width of the tire's contact patch was 100.9, and the index representing the area of the tire's contact patch was 102.5. Accordingly, both the width of the tire's contact patch and the area of the tire's contact patch were improved.

As a consequence, the pneumatic radial tire of Example showed better handling stability at the time when the vehicle turned, so that the index representing the average running speed was 100.8, and an improvement in the average running speed was observed.

Other Embodiments

Although the invention has been described on the basis of the above-described embodiment, the description and the drawings that form part of the disclosure should not be understood as limitations to the invention. On the basis of the disclosure, those skilled in the art may conceive of various alternative embodiments, examples, and techniques to carry out the invention.

Needless to say, the invention includes various other embodiments that are not described in this disclosure. Accordingly, the technical scope of the invention is determined solely by the features to specify the invention described in the claims that are reasonable in view of the description given above.

The entire content of Japanese Patent Application No. 2007-286335 (filed on Nov. 2, 2007) is incorporated into the description of the present application by reference.

INDUSTRIAL APPLICABILITY

As has been described above, the pneumatic radial tire according to the invention is useful because the pneumatic radial tire helps the vehicle to secure certain drainage of the tread portion and certain straight-running stability and to improve the handling stability at the time when the vehicle turns.

The invention claimed is:
1. A pneumatic radial tire comprising:
a pair of annular bead portions;
a tread portion located at an external side, in a tire-radial direction, of the pair of bead portions, and including a tread surface portion;
a pair of sidewall portions each connecting one of both end portions of the tread portion in tire-width directions and an outward end in the tire-radial direction of the corresponding one of the bead portions; and
a carcass layer extending continuously across and through the bead portions, the sidewall portions, and the tread portion, the carcass layer being configured to form a framework of the tire,
wherein main grooves are formed respectively in a tire's equatorial portion including a center line in the tire-width directions of the tread portion and in a portion located closer to a vehicle-fitted inner side than the tire's equatorial portion is, each main groove extending continuously in a tire-circumferential direction of the tread portion, a first shoulder land portion row and a second shoulder land portion row are formed in a portion of the tread located closer to a vehicle-fitted outer side than the tire's equatorial portion, the first shoulder land portion row has a plurality of blocks which are consecutively arranged in the tire-circumferential direction, a V shaped groove is extended in the tire-circumferential direction and is formed between the first shoulder land portion row and the second shoulder land portion row, and includes first sloping-surfaces as side walls provided at the first shoulder land portion row side and second sloping-surfaces as side walls provided at the second shoulder land portion row side, the first sloping-surfaces each is inclined inwardly in the tire-radial direction from the first shoulder land portion row toward the second shoulder land portion row, the second sloping-surfaces each is inclined inwardly in the tire-radial direction from the second shoulder land portion row toward the first shoulder land portion row, the first sloping-surfaces and the second sloping-surfaces are arranged alternately in the tire-circumferential direction, a depth of the V shaped groove varies from a first portion to a second portion in the tire-circumferential direction, in a section taken in the tire-width directions, a surface curvature radius of a case line of the carcass layer on the vehicle-fitted outer side is larger than a surface curvature radius of a case line of the carcass layer on the vehicle-fitted inner side while the tire is inflated with air, wherein an outside lateral groove is connected to the V-shaped groove and the outside lateral groove has a V-shape in the tire width direction such that an apex of the outside lateral groove is adjacent to the V-shaped groove.

2. The pneumatic radial tire according to claim 1, wherein a length, measured in the tire-radial direction, from a widest convex portion of the sidewall portion to the bead portion on the vehicle-fitted outer side is shorter than a corresponding length on the vehicle-fitted inner side, the widest convex portion on each side being a portion that protrudes most in the tire-width directions.

3. The pneumatic radial tire according to claim 1, wherein an area of a contact patch of the tread portion on the vehicle-fitted outer side is larger than a corresponding area on the vehicle-fitted inner side while the tire is fitted to the vehicle.

4. The pneumatic radial tire according to claim 1, wherein, in the tread portion, inner-side lateral grooves each extending in the tire-width directions are formed in a portion located at an inner side of the tire's equatorial portion, and outer-side lateral grooves each extending in the tire-width directions are formed in a portion located at an outer side of the tire's equatorial portion, and pitches between two outer-side lateral grooves that are adjacent to each other in the tire-circumferential direction are larger than pitches between two inner-side lateral grooves that are adjacent to each other in the tire-circumferential direction.

5. The pneumatic radial tire according to claim 4, wherein the pitches between two outer-side lateral grooves that are adjacent to each other in the tire-circumferential direction are approximately twice as wide as the pitches between two inner-side lateral grooves that are adjacent to each other in the tire-circumferential direction.

6. The pneumatic radial tire according to claim 4, wherein the pitches between two inner-side lateral grooves that are adjacent to each other in the tire-circumferential direction are within a range from 2.5% to 5% of a circumferential length of the tire.

7. The pneumatic radial tire according to claim 4, wherein the pitches between two outer-side lateral grooves that are adjacent to each other in the tire-circumferential direction are within a range from 5% to 10% of the circumferential length of the tire.

8. The pneumatic radial tire according to claim 1, wherein a width, measured in the tire-width directions, of an outside-shoulder land-portion row is wider than a width, measured in the tire-width directions, of an inside-shoulder land-portion row, the outside-shoulder land-portion row is included in the tread portion and formed closer to the vehicle-fitted outer side than the tire's equatorial portion extending in the tire-circumferential direction, and the inside-shoulder land-portion row is included in the tread portion and formed closer to the vehicle-fitted inner side than the tire's equatorial portion extending in the tire-circumferential direction.

9. The pneumatic radial tire according to claim 8, wherein the width, measured in the tire-width directions, of the outside-shoulder land-portion row is approximately 1.5 times as wide as the width, measured in the tire-width directions, of the inside-shoulder land-portion row.

10. The pneumatic radial tire according to claim 1, wherein each of the sidewall portions includes a rim-guard portion that protrudes more externally in the tire-width directions than a rim flange where the corresponding bead portion is attached while the tire is fitted to a wheel.

11. The pneumatic radial tire according to claim 1, wherein the first sloping-surfaces and the second sloping-surfaces overlap as viewed in the tire-circumferential direction, forming an overlapped portion, and the overlapped portion forms the V shaped portion.

* * * * *